United States Patent
Han et al.

(10) Patent No.: US 10,499,082 B2
(45) Date of Patent: Dec. 3, 2019

(54) OPTIMIZED CODING METHOD FOR OMNIDIRECTIONAL VIDEO, COMPUTER READABLE STORAGE MEDIUM AND COMPUTER DEVICE

(71) Applicant: SHENZHEN BOYAN TECHNOLOGY LTD., Shenzhen (CN)

(72) Inventors: Yuxing Han, Guangzhou (CN); Jiangtao Wen, Beijing (CN); Minhao Tang, Beijing (CN)

(73) Assignee: SHENZHEN BOYAN TECHNOLOGY LTD., Shenzhen (CN)

( * ) Notice: Subject to any disclaimer, the term of this patent is extended or adjusted under 35 U.S.C. 154(b) by 159 days.

(21) Appl. No.: 15/707,348

(22) Filed: Sep. 18, 2017

(65) Prior Publication Data

US 2018/0367802 A1    Dec. 20, 2018

(30) Foreign Application Priority Data

Jun. 19, 2017    (CN) .......................... 2017 1 0464645

(51) Int. Cl.
*H04N 19/159*    (2014.01)
*H04N 19/11*    (2014.01)
(Continued)

(52) U.S. Cl.
CPC ......... *H04N 19/597* (2014.11); *H04N 13/106* (2018.05); *H04N 19/11* (2014.11);
(Continued)

(58) Field of Classification Search
None
See application file for complete search history.

(56) References Cited

U.S. PATENT DOCUMENTS

| 2015/0143239 A1* | 5/2015 | Birkbeck | G06F 3/0484 |
| | | | 715/716 |
| 2017/0294049 A1* | 10/2017 | Zhou | H04N 21/816 |

(Continued)

FOREIGN PATENT DOCUMENTS

| CN | 103024445 A | 4/2013 |
| CN | 106412594 A | 2/2017 |
| CN | 106658011 A | 5/2017 |

OTHER PUBLICATIONS

Aminlou et al., "Viewport-Adaptive Encoding and Streaming of 360-degree Video for Virtual Reality Applications," 2016.*

(Continued)

*Primary Examiner* — Michael J Hess
(74) *Attorney, Agent, or Firm* — Volpe and Koenig, P.C.

(57) ABSTRACT

The present invention discloses an optimized coding method for an omnidirectional video, computer readable storage medium and computer device to solve the technical problem that the video quality cannot be guaranteed under a low code rate in the prior art. The method includes: obtaining attribute information of each coding unit of an omnidirectional video file, wherein each coding unit is a storage and coding unit of the omnidirectional video file; determining a coding mode corresponding to each coding unit according to the attribute information of each coding unit; and coding each coding unit according to the coding mode corresponding to each coding unit.

6 Claims, 4 Drawing Sheets

(51) Int. Cl.
| | |
|---|---|
| *G02B 27/01* | (2006.01) |
| *H04N 13/161* | (2018.01) |
| *H04N 19/597* | (2014.01) |
| *H04N 19/139* | (2014.01) |
| *H04N 13/106* | (2018.01) |
| *H04N 19/146* | (2014.01) |
| *H04N 21/218* | (2011.01) |
| *H04N 19/167* | (2014.01) |

(52) U.S. Cl.
CPC ......... *H04N 19/139* (2014.11); *H04N 19/146* (2014.11); *H04N 19/167* (2014.11); *H04N 21/21805* (2013.01); *G02B 27/017* (2013.01); *H04N 13/161* (2018.05); *H04N 19/159* (2014.11)

(56) References Cited

U.S. PATENT DOCUMENTS

| | | | |
|---|---|---|---|
| 2017/0359586 A1* | 12/2017 | Xue | H04N 19/167 |
| 2017/0374375 A1* | 12/2017 | Makar | H04N 19/126 |
| 2018/0007339 A1* | 1/2018 | Castleman | H04L 65/4069 |
| 2018/0249163 A1* | 8/2018 | Curcio | H04N 19/167 |
| 2018/0288356 A1* | 10/2018 | Ray | H04N 19/176 |
| 2018/0295375 A1* | 10/2018 | Ratner | H04N 19/436 |
| 2019/0068993 A1* | 2/2019 | Aflaki Beni | H04N 13/243 |
| 2019/0082184 A1* | 3/2019 | Hannuksela | H04N 13/161 |

OTHER PUBLICATIONS

De Simone et al., "Geometry-Driven Quantization for Omnidirectional iamge coding," 2016.*

Yu et al., "A Framework to Evaluate Omnidirectional Video Coding Schemes," 2015.*

Horn et al. "Determining Optical Flow" Massachusetts Institute of Technology, Artificial Intelligence Laboratory, A.I. Memo No. 572. Apr. 1980. 28 pp.

Ng et al. "Data Compression and Transmission Aspects of Panoramic Videos" IEEE Transactions on Circuits and Systems for Video Technology, vol. 15, No. 1, Jan. 2005. 15 pp.

Ohm et al. "Comparison of the Coding Efficiency of Video Coding Standards—Including High Efficiency Video Coding (HEVC)" IEEE Transactions on Circuits and Systems for Video Technology, vol. 22, No. 12, Dec. 2012. 16 pp.

Richardson "H.264/MPEG-4 Part 10 White Paper" www.vcodex.com. Jul. 10, 2012. 47 pp.

Sullivan et al. "Overview of the High Efficiency Video Coding (HEVC) Standard" IEEE Transactions on Circuits and Systems for Video Technology, vol. 22, No. 12, Dec. 2012. 20 pp.

Wen et al. "R-$\lambda$ Model Based Improved Rate Control for HEVC with Pre-Encoding" IEEE Computer Society. 2015 Data Compression Conference. 10 pp.

* cited by examiner

OPTIMIZED CODING METHOD FOR OMNIDIRECTIONAL VIDEO, COMPUTER READABLE STORAGE MEDIUM AND COMPUTER DEVICE

CROSS REFERENCE TO RELATED APPLICATIONS

This application claims priority to chinese Application No. 201710464645.4, which is specifically and entirely incorporated by reference.

FIELD OF THE INVENTION

The present disclosure relates to the field of videos, and specifically to an optimized coding method for an omnidirectional video, computer readable storage medium and computer device.

BACKGROUND OF THE INVENTION

An omnidirectional video is wide-angle video content beyond a general field of vision. For example, a circular or a cylindrical 360-degree video provides the field of vision of 360 degrees in the horizontal direction. The omnidirectional videos are stereoscopic and realistic and can provide wonderful sight experience.

Omnidirectional videos can be recorded by use of a plurality of methods, wherein the use of a plurality of lenses or video cameras may provide high video quality, but video files generated typically have sizes being triple or quadruple, even more, of the sizes of common video files. It is a big challenge for storage and network transmission. Especially, during network transmission, excessive bandwidth requirements often cannot be met.

Actually, with the development of the VR (Virtual Reality) technology, the phrase "omnidirectional video" has been gradually regarded by many people as the primary synonym of the specific presentation form of virtual reality contents. How to reduce the sizes of video files and save the bandwidth while guaranteeing the video quality has become a hot research problem of the VR technology.

Due to the limitations of the network bandwidth and the cost control on network transmission, a requirement is cast on compression of an omnidirectional video to a relatively low code rate. However, the VR technology has an extremely high requirement on the quality of an omnidirectional video for the sake of providing users the immersive experience. When an omnidirectional video is compressed to such the code rate in accordance with the current video coding standards, the video quality is reduced, thereby failing in meeting the requirement of the VR technology.

SUMMARY OF THE INVENTION

An objective of the present disclosure is to provide an optimized coding method for an omnidirectional video, computer readable storage medium and computer device to solve the technical problem of failing in guaranteeing the video quality at a relatively low code rate in the prior art.

In order to achieve the above objective, a first aspect of the present disclosure provides an optimized coding method for an omnidirectional video. The method includes:
obtaining attribute information of each coding unit of an omnidirectional video file;
determining a coding mode corresponding to each coding unit according to the attribute information of each coding unit; and coding each coding unit according to the coding mode corresponding to each coding unit.

In a first possible implementation of the first aspect, the omnidirectional video file is a video file that is obtained and stored by processing an omnidirectional video stream in a cube map projection mode, wherein the omnidirectional video file includes a plurality of sub-video files stored independently; the step of obtaining the attribute information of each coding unit of the omnidirectional video file includes: obtaining motion vector information of each coding unit of the sub-video files in a pre-compression mode, the attribute information including the motion vector information.

In a second possible implementation of the first aspect, the omnidirectional video file is a video file that is obtained and stored by processing an omnidirectional video stream in an Equirectangular projection mode; the step of obtaining the attribute information of each coding unit of the omnidirectional video file includes: optimizing a coding weight parameter according to an actual display area of each coding unit during playing, the attribute information including the optimized coding weight parameter.

In a third possible implementation of the first aspect in combination with the first possible implementation of the first aspect, the step of determining the coding mode corresponding to each coding unit according to the attribute information of each coding unit includes: determining that the coding unit satisfies a low motion intensity condition according to the motion vector information of the coding unit, and determining the coding mode corresponding to the coding unit as a low code rate coding mode.

In a fourth possible implementation of the first aspect in combination with the first or third possible implementation of the first aspect, the method further includes: predicting a viewing direction of a viewer at each moment when the omnidirectional video is played; at any moment of viewing, transmitting a sub-video file in the viewing direction of the viewer at next moment according to a first stream transmission mode, and transmitting sub-video files beyond the viewing direction of the viewer at next moment according to a second stream transmission mode, wherein a frame rate of the first stream transmission mode is higher than a frame rate of the second stream transmission mode.

In a fifth possible implementation of the first aspect in combination with the fourth possible implementation of the first aspect, the step of predicting the viewing direction of a viewer at each moment when the omnidirectional video is played includes: obtaining historical viewing information of the omnidirectional video; and predicting the viewing direction of a viewer at each moment according to the historical viewing information.

In a sixth possible implementation of the first aspect in combination with the second possible implementation of the first aspect, the step of optimizing the coding weight parameter according to the actual display area of each coding unit during playing includes: optimizing the coding weight parameter through calculation in accordance with the following equation:

$$\operatorname{argmin} \sum_i \cos(\varphi_i) D_i \text{ s.t. } \sum_i R_i = R;$$

with $D_i$ representing a degree of distortion of the i-th pixel, $R_i$ being a number of bits used by the i-th pixel, $\varphi_i$ being a latitude of the i-th pixel, $\overline{\cos(\varphi)}$ being an average value of cosine values of latitudes of all pixels in the coding unit, and R being a total number of bits occupied by the coding unit, wherein $D_i$ and $R_i$ corresponding to the optimal solutions in the above equation are also solutions of the following equation:

$$J = \sum_i \cos(\varphi)D_i + \lambda R \approx \overline{\cos(\varphi)} \sum_i D_i + \lambda R;$$

with λ being a coding weight parameter assigned to the coding unit and an objective of rate constrained distortion optimization (RDO) being minimizing J.

In a seventh possible implementation of the first aspect in combination with the sixth possible implementation of the first aspect, the step of determining the coding mode corresponding to the coding unit according to the attribute information of the coding unit includes: calculating a quantization parameter QP of the coding unit according to the optimized coding weight parameter in accordance with the following equation:

$$QP = \lfloor 4.2005 \log(\lambda) + 13.7122 + 0.5 \rfloor,$$

wherein QP determines the degree of distortion of the coding unit after being coded; and determining the coding mode corresponding to the coding unit according to the quantization parameter.

A second aspect of the present disclosure further provides an optimized coding device for an omnidirectional video. The device includes:
a first obtaining unit configured to obtain attribute information of each coding unit of an omnidirectional video file, wherein each coding unit is a storage and coding unit of the omnidirectional video file;
a determining unit configured to determine a coding mode corresponding to each coding unit according to the attribute information of each coding unit;
a coding unit configured to code each coding unit according to the coding mode corresponding to each coding unit.

Optionally, the coding device includes units configured to realize the method in any possible implementation of the first aspect as described above.

A third aspect of the present disclosure further provides another coding device for an omnidirectional video. The device includes: a processor, a memory, an interface and a communication bus, wherein the processor, the memory and the interface communicate with one another by means of the communication bus; the memory is configured to store program codes, and the processor is configured to run the program codes to carry out the method of the first aspect or the method in any possible implementation of the first aspect as described above.

A fourth aspect of the present disclosure further provides a computer readable storage medium with a computer program stored thereon, wherein the program realizes method comprising the following steps:
obtaining attribute information of each coding unit of an omnidirectional video file;
determining a coding mode corresponding to each coding unit according to the attribute information of each coding unit; and
coding each coding unit according to the coding mode corresponding to each coding unit.

A fifth aspect of the present disclosure further provides an computer device, comprising:

the computer readable storage medium of the fourth aspect; and
one or more processors, used for executing the program in the computer readable storage medium.

According to the above technical solutions, the attribute information of each coding unit of an omnidirectional video file is obtained, and all the coding units are coded in different coding modes depending on different attribute information. In this way, with regard to the coding units which have low motion intensity or are in the edge of the range of field of view of a user, they may be coded in a low code rate coding mode; with regard to the coding units which have high motion intensity or are in the center of the range of the field of view of the user, they may be coded in a high code rate coding mode. Thus, the quality of the coded omnidirectional video is guaranteed, and the code rate of the omnidirectional video is reduced, accompanied with reduction of the size of the video file and saving of the bandwidth occupied by video stream transmission.

Specifically, other features and advantages of the present disclosure will be described in detail in the subsequent part of detailed description of the embodiments.

BRIEF DESCRIPTION OF THE DRAWINGS

Accompanying drawings are intended for providing further understanding of the present disclosure and form part of the description to explain, rather than limiting, the present disclosure together with the following embodiments, in which.

DETAILED DESCRIPTION OF THE EMBODIMENTS

The embodiments of the present disclosure will be described in detail below in conjunction with the accompanying diagrams. It should be understood that the embodiments described herein are merely intended for describing and explaining, rather than limiting, the present disclosure.

In order to allow easier understanding on the improvements of the technical solutions provided by the embodiments of the present disclosure in contrast with the prior art for a person skilled in the art, the prior art and relevant technical terms will be first introduced briefly below.

Projection is a mathematic process allowing correct expansion of real scenes of the full-physical field of vision on a two-dimensional picture and restoration thereof in VR glasses to realize immersive viewing.

Figure 1:
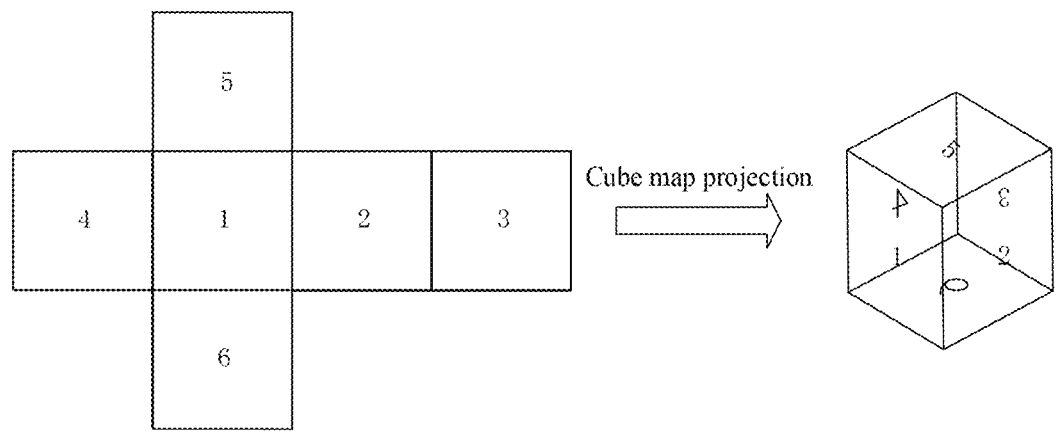
FIG. 1 is a schematic diagram of cube map projection provided by an embodiment of the present disclosure.

Cube map projection means projection of a omnidirectional map into six faces of a cube with the horizontal and vertical angles of view of each face being 90 degree. As shown in FIG. 1, a omnidirectional map includes 1 to 6 six pictures, and the process of projecting the omnidirectional map into the six-face cube is the cube map projection. Then, if a viewer is located at the center of the cube, 1 to 6 six pictures are pictures in six directions, namely the front and back, left and right, up and down directions, of the viewer. The use of the cube map projection may cause reduction of distortion of an object and improvement of the compression capability; in addition, the six faces are completely independent and can be processed separately.

Figure 2:
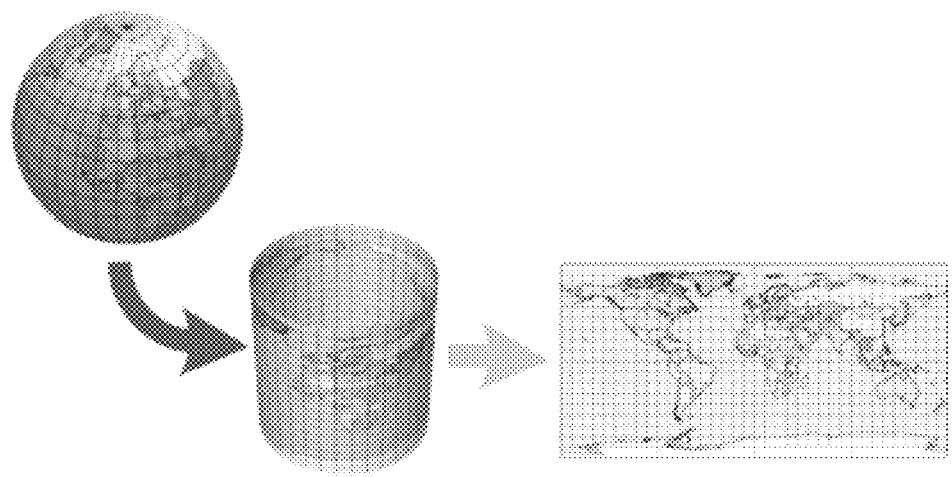
FIG. 2 is a schematic diagram of Equirectangular projection provided by an embodiment of the present disclosure.

Equirectangular projection, as shown in FIG. 2, is used in such a process of projecting a spherical world map into a two-dimensional world map. The Equirectangular projection is featured by well maintaining of a picture size at the horizontal angle of view and infinite size extension, especially when approaching two poles, at the vertical angle of view.

In the existing HEVC, the frame pictures of an omnidirectional video are typically sampled by use of a down-sampling strategy. Specifically, down-sampling requires to first determine RoIs (regions-of-interest) for a user in the frame pictures of the omnidirectional video, wherein the RoI is a region needing to be processed, which is drawn in such a form of a box, a circle, an ellipse or an irregular polygon from a processed picture in machine vision and picture processing. Various algorithms and functions are often used in machine vision software to find out the RoIs and then next processing of pictures is carried out.

Specifically, different coding modes are employed for pixels in the RoIs and pixels beyond the RoIs in the existing HEVC, allowing for saving about 50% of bits in contrast with H.264/AVC compression modes. However, the coding efficiency of the HEVC still fails in meeting the requirement of a VR video. Human's vision system is able to discriminate 60 pixels each degree; therefore, if it is expected that a user can not see pixel points in a display, the display is at least required with the resolution of 16000*16000, which is 32 times that of a 4K video at present and cannot be achieved by means of the current HEVC.

Moreover, because not all pictures have the RoI, and the RoIs of some pictures change continuously, resulting in that they can not be traced. For these reasons, the down-sampling strategy is not suitable for all omnidirectional video files.

Figure 3:
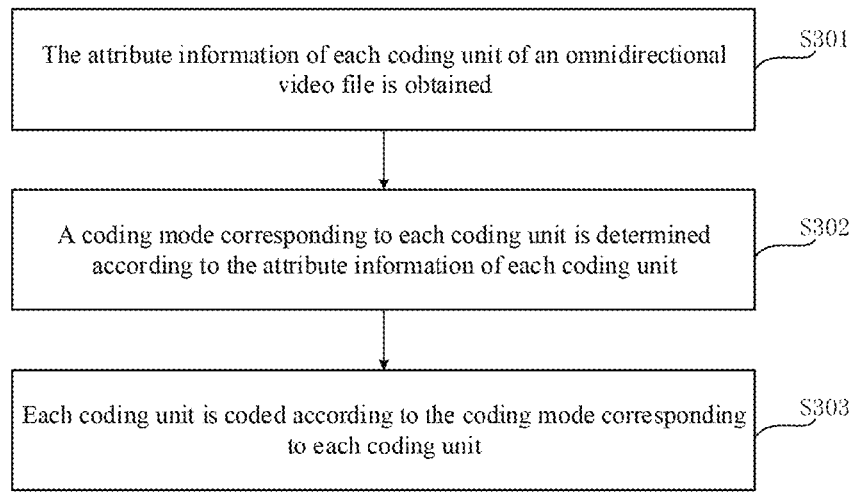
FIG. 3 is a schematic flow chart of an optimized coding method for an omnidirectional video provided by an embodiment of the present disclosure.

An embodiment of the present disclosure, for the sake of solving the above technical problems, provides an optimized coding method for an omnidirectional video. As shown in FIG. 3, the method includes the following steps.

S301, the attribute information of each coding unit of an omnidirectional video file is obtained.

It needs to be noted that the omnidirectional video file may be a video file obtained and stored by performing cube map projection on an omnidirectional video stream, or a video file obtained or stored by Equirectangular projection.

In the case that the omnidirectional video file is a video file that is obtained and stored by performing cube map projection on an omnidirectional video stream, the attribute information may include the motion vector information of each coding unit; in the case that the omnidirectional video file is a video file that is obtained and stored by performing Equirectangular projection on an omnidirectional video stream, the attribute information may include a coding weight parameter of each coding unit, wherein the coding weight parameter is related to the actual display area of the coding unit during playing, and may also be considered to be related to the dimensions of the coding unit on the spherical surface of the omnidirectional video.

S302, a coding mode corresponding to each coding unit is determined according to the attribute information of each coding unit.

It needs to be noted that a coding mode is a mode of converting a file in a certain video format into a file in another video format by means of a specific compression technique. At present, there exist a plurality of coding modes in video stream transmission, for example, the coding standards such as H.261, H.263 and H.264 of International Telecommunication Union. Each coding mode has a different code rate for a video.

S303, each coding unit is coded according to the coding mode corresponding to each coding unit.

By using the above technical solution, the attribute information of each coding unit of an omnidirectional video file is obtained, and all the coding units are coded in different coding modes depending on different attribute information. In this way, with regard to the coding units which have low motion intensity or are in the edge of the range of field of view of a user, they may be coded in a low code rate coding mode; with regard to the coding units which have high motion intensity or are in the center of the range of the field of view of the user, they may be coded in a high code rate coding mode. Thus, the quality of the coded omnidirectional video is guaranteed, and the code rate of the omnidirectional video is reduced, accompanied with reduction of the size of the video file and saving of the bandwidth occupied by video stream transmission.

In order to allow easier understanding on the technical solutions provided by the embodiments of the present disclosure for a person skilled in the art, the above steps will be described in detail below.

In a possible implementation of the embodiment of the present disclosure, the omnidirectional video file is a video file that is obtained and stored by processing an omnidirectional video stream in the cube map projection mode, wherein the omnidirectional video file includes a plurality of sub-video files stored independently; then, the above step S301 includes: obtaining motion vector information of each coding unit of the sub-video files in a pre-compression mode, the attribute information including the motion vector information.

With the omnidirectional video shown in FIG. 1 as an example for illustration, the omnidirectional video file includes 1 to 6 six independent sub-video files. A video having high motion intensity requires a high frame rate to ensure a viewing effect for users. The pre-compression mode of low complexity is adopted for processing each coding unit in the embodiment of the present disclosure, in which the motion vector information of the coding unit may be obtained by analysis, and the motion intensity of the coding unit may be determined according to the motion vector information.

Further, the above step S302 includes: determining that the coding unit satisfies a low motion intensity condition according to the motion vector information of the coding unit, and determining the coding mode corresponding to the coding unit as a low code rate coding mode.

Exemplarily, after the motion vector information of each coding unit is obtained through the pre-compression processing, the motion intensity of the coding unit may be determined through the following calculation:

mean(abs($mv.x$))<0.1% FrameWidth;

mean(abs($mv.y$))<0.1% FrameHeight;

max(abs($mv.x$))<0.1% FrameWidth;

max(abs($mv.y$))<0.1% FrameHeight.

Specifically, mv.x represents a motion vector of a pixel in the horizontal direction; mv.y represents a motion vector of a pixel in the vertical direction; abs represents evaluating an absolute value; mean represents evaluating a mean value; max represents evaluating a maximum; FrameWidth represents the width of a frame picture; FrameHeight represents a height of the frame picture.

Stated another way, the coding unit satisfying the above condition is relatively low in motion intensity and may be coded with less bits.

Compared with the RoI-based coding method in the prior art, the above coding method provided by the present disclosure does not need the RoI, and thus is wider in application range. That is, for a picture without the RoI or with untraceable RoI, the embodiment of the present disclosure may also be applicable. Moreover, since only the motion vector information needs to be obtained, pre-compression may only be carried out on 2N*2N models in all 16*16 pixel matrices in the embodiment of the present disclosure, such that the rate of pre-compression may be hundreds of times higher than that of HEVC without influence on the efficiency of video coding.

In order to further reduce the bandwidth occupied by the omnidirectional video file during stream transmission, the embodiment of the present disclosure may also allow prediction of a viewing direction of a viewer at each moment when the omnidirectional video is played, and transmission, at any moment of viewing, of a sub-video file in the viewing direction of the viewer at next moment according to a first stream transmission mode, and sub-video files beyond the viewing direction of the viewer at next moment according to a second stream transmission mode, wherein a frame rate of the first stream transmission mode is higher than a frame rate of the second stream transmission mode at any moment of viewing.

Figure 4:
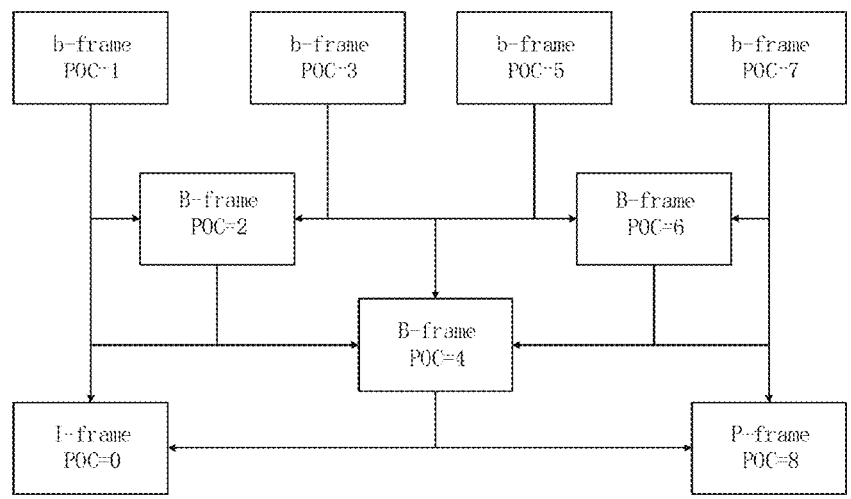
FIG. 4 is a structural schematic diagram of an omnidirectional video stream provided by an embodiment of the present disclosure.

Exemplarily, FIG. 4 shows the frames of a coded video numbered from 0 to 8 as POCs (picture order counts), wherein an independently coded frame is referred to as I-frame, and a one-way predicted frame generated with reference to the prior I-frame is referred to as P-frame. Yet another two-way predicted frame generated by coding with reference to prior and posterior frames is referred to as B-frame. In addition, b-frame may not be referred by other frames; that is to say, an decoding error of a prior b-frame will not affect the decoding of any one posterior frame. In this way, the second stream transmission mode may be a mode of skipping b-frames and transmitting only I-frame, P-frame and B-frames in stream transmission. As shown in FIG. 4, the number of b-frames accounts for almost a half of the number of stream-transmitted frames, and therefore, no transmission of b-frames will cause saving of almost a half of bandwidth.

Optionally, the embodiment of the present disclosure may allow obtaining of the historical viewing information of the omnidirectional video and prediction of the viewing direction of a viewer at each moment according to the historical viewing information.

Specifically, a device for viewing an omnidirectional video, for example, VR glasses or a VR helmet, may record the historical viewing information of a user each time. On the basis of the historical viewing information, the embodiment of the present disclosure may allow statistical acquisition of the viewing direction of a user at each moment and further prediction of the viewing direction of the user at each moment next time.

Exemplarily, the embodiment of the present disclosure may allow classification of viewing behaviors of users into three categories according to the historical viewing information: looking around, looking at a region-of-interest, and following region-of-interest. Specifically, a user looks around, the center of the field of view moves within a large region, and in this case, each sub-video file of the omnidirectional video file can be transmitted in the above first stream transmission mode. When a user looks at a region-of-interest, the sub-video file which is located in the region-of-interest may be transmitted in the above first stream transmission mode, and other sub-video files may be transmitted in the above second stream transmission mode to save the bandwidth. In the case where a user follows a region-of-interest, the sub-video file which appears in the region-of-interest next time may be transmitted in the above first stream transmission mode, and the sub-video file which does not appear in the region-of-interest next time may be transmitted in the above second stream transmission mode.

The foregoing description is illustrative only, and the embodiment of the present disclosure may also allow prediction of the viewing direction of a user at each moment in other ways. For example, when a user wears VR glasses, the sub-video file directly in the front of the field of view of the user at this moment is determined in real time, and the viewing direction of the user at next moment is predicted based on the current viewing behavior of the user. The predicting ways are not limited in the present disclosure.

Figure 5:
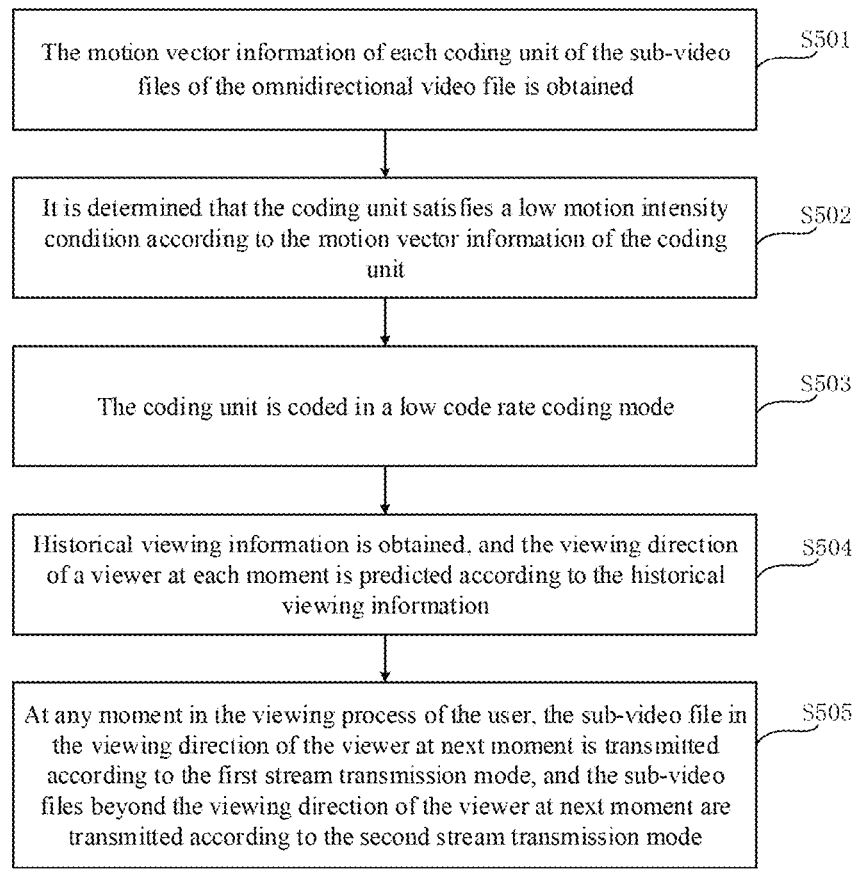
FIG. 5 is a schematic flow chart of another optimized coding method for an omnidirectional video provided by an embodiment of the present disclosure.

Stated another way, as shown in FIG. 5, for an omnidirectional video file obtained through the cube map projection, the omnidirectional video coding provided in the embodiment of the present disclosure may comprise the following steps.

S501, the motion vector information of each coding unit of the sub-video files of the omnidirectional video file is obtained.

The details of this step refer to the above specific descriptions of step S301, which are not redundantly described herein.

S502, it is determined that the coding unit satisfies a low motion intensity condition according to the motion vector information of the coding unit.

S503, the coding unit is coded in a low code rate coding mode.

The details of the two steps refer to the above specific descriptions of step S302, which are not redundantly described herein.

Further, the embodiment of the present disclosure may also allow execution of steps S504 to S505 during stream transmission of the omnidirectional video file.

S504, historical viewing information is obtained, and the viewing direction of a viewer at each moment is predicted according to the historical viewing information.

S505, at any moment in the viewing process of the user, the sub-video file in the viewing direction of the viewer at next moment is transmitted according to the first stream transmission mode, and the sub-video files beyond the viewing direction of the viewer at next moment are transmitted according to the second stream transmission mode.

The details of the two steps refer to the above descriptions of FIG. 4, which are not redundantly described herein.

By using the above method, the coding units are coded in different coding modes for the motion intensity of each coding unit at the coding phrase of a video, and at the phrase of stream transmission, with regard to the viewing behaviors of a user, different stream transmission modes are adopted for the sub-video files, thus allowing reduction of the size of the omnidirectional video file and the transmission bandwidth under the premise of guaranteeing that the user's experience is not affected by the video quality.

In another possible implementation of the embodiment of the present disclosure, the omnidirectional video file is a video file that is obtained and stored by processing an omnidirectional video stream in the Equirectangular projection mode. Then, the above step S301 includes: a coding weight parameter is optimized according to an actual display area of each coding unit during playing, the attribute information including the optimized coding weight parameter.

It needs to be noted that in the existing HEVC mode, a quantization parameter QP of a frame level is assigned for an omnidirectional video file obtained through the Equirectangular projection. The quantization parameter QP substantially determines a degree of distortion D of the coded video data. In addition, the existing HEVC coding mode gives comprehensive consideration to the degree of distortion and code rate of a video with (D+λR) as an optimization objective. Specifically, the value of λ depends on QP, and is optimal when the value of (D+λR) is minimal. However, equal-weighted QP is assigned for each coding unit in the prior art, with the coding units at two poles and those of zero latitude having the same QP.

In the embodiment of the present disclosure, the assignment of the quantization parameter QP is performed on the basis of latitude, allowing occupation of less bits by data closer to two poles and occupation of more bits by data at lower latitudes.

Specifically, the step of optimizing the coding weight parameter according to the actual display area of each coding unit during playing includes:
optimizing the coding weight parameter through calculation in accordance with the following equation:

$$\operatorname{argmin} \sum_i \cos(\varphi_i) D_i \text{ s.t. } \sum_i R_i = R,$$

wherein $D_i$ represents a degree of distortion of the i-th pixel; $R_i$ is a number of bits used by the i-th pixel; $\varphi_i$ is a latitude of the i-th pixel; $\overline{\cos(\varphi)}$ is an average value of cosine values of latitudes of all pixels in the coding unit; R is a total number of bits used by the coding unit, and wherein $D_i$ and $R_i$ corresponding to the optimal solutions in the above equation are also solutions of the following equation:

$$J = \sum_i \cos(\varphi) D_i + \lambda R \approx \overline{\cos(\varphi)} \sum_i D_i + \lambda R,$$

with λ being a coding weight parameter assigned to the coding unit and an objective of the rate constrained distortion optimization (RDO) being minimizing J.

As can be seen from the above, the QP of the coding unit level is assigned in the embodiment of the present disclosure, and the optimization objective comprehensively takes the degree of distortion and code rate of the coding unit into account. The smaller the value of J, the better the coding of the coding unit. Compared with the QP of the frame level assigned in the prior art, the optimal value of λ in the embodiment of the present disclosure will be increased by 1 $\sqrt{\cos(\varphi)}$ times.

Further, the step of determining the coding mode corresponding to the coding unit according to the attribute information of the coding unit includes: calculating a quantization parameter QP of the coding unit according to the optimized coding weight parameter in accordance with the following equation:

QP=⌊4.2005 log(λ)+13.7122+0.5⌋, wherein QP directly determines the degree of distortion of the coding unit after being coded; and determining the coding mode corresponding to the coding unit according to the quantization parameter.

By using the above method, for an omnidirectional video file obtained through the Equirectangular projection, less bits are occupied by data closer to two poles, and more bits are occupied by data at lower latitudes, thus reducing the size and transmission bandwidth of the omnidirectional video file under the premise of guaranteeing that the user's experience is not affected by the video quality.

Figure 6A:
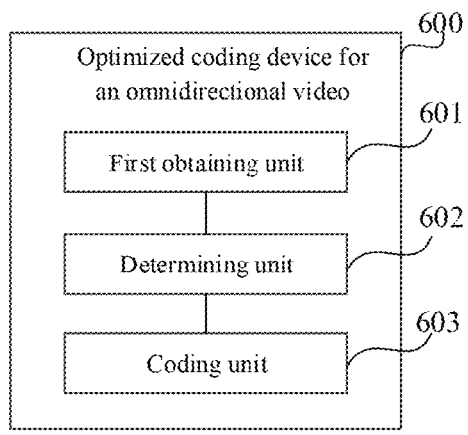
FIG. 6A is a structural schematic diagram of an optimized coding device for an omnidirectional video provided by an embodiment of the present disclosure.

An embodiment of the present disclosure further provides an optimized coding device 600 for an omnidirectional video to carry out the optimized coding method for an omnidirectional video provided by the above method embodiment. As shown in FIG. 6A, the optimized coding device 600 for an omnidirectional video includes:
a first obtaining unit 601 configured to obtain attribute information of each coding unit of an omnidirectional video file, wherein each coding unit is a storage and coding unit of the omnidirectional video file;
a determining unit 602 configured to determine a coding mode corresponding to each coding unit according to the attribute information of each coding unit;
a coding unit 603 configured to code each coding unit according to the coding mode corresponding to each coding unit.

The device as described above is used to obtain the attribute information of each coding unit of an omnidirectional video file, and code all the coding units in different coding modes depending on different attribute information. In this way, with regard to the coding units which have low motion intensity or are in the edge of the range of field of view of a user, they may be coded in a low code rate coding mode; with regard to the coding units which have high motion intensity or are in the center of the range of the field of view of the user, they may be coded in a high code rate coding mode. Thus, the quality of the coded omnidirectional video is guaranteed, and the code rate of the omnidirectional video is reduced, accompanied with reduction of the size of the video file and saving of the bandwidth used in video stream transmission.

Optionally, the omnidirectional video file is an omnidirectional video file obtained and stored by processing an omnidirectional video stream in the cube map projection mode, wherein the omnidirectional video file includes a plurality of sub-video files stored independently. Then, the first obtaining unit 601 is configured to: obtain motion vector information of each coding unit of the sub-video files in a pre-compression mode, the attribute information including the motion vector information.

Optionally, the determining unit 602 is configured to: determine that the coding unit satisfies a low motion intensity condition according to the motion vector information of the coding unit, and determine the coding mode corresponding to the coding unit as a low code rate coding mode.

Figure 6B:
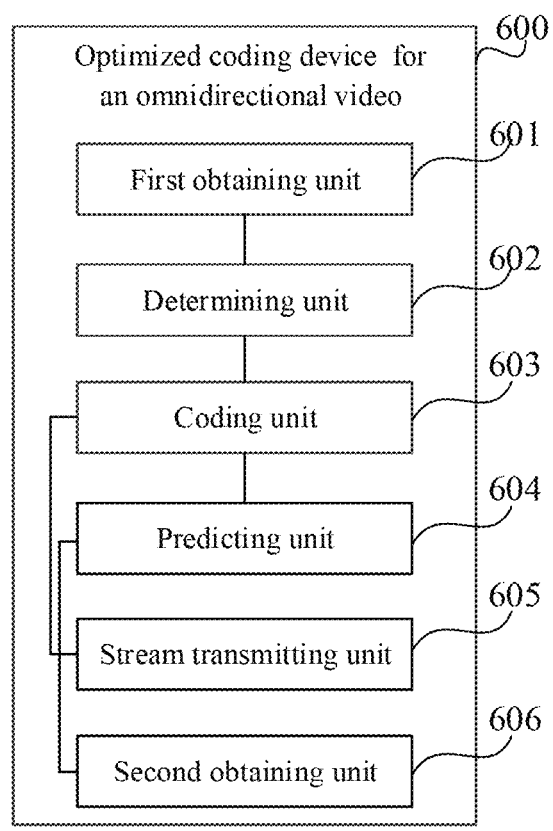
FIG. 6B is a structural schematic diagram of another optimized coding device for an omnidirectional video provided by an embodiment of the present disclosure.

Optionally, as shown in FIG. 6B, the device 600 may further include:
a predicting unit 604 configured to predict a viewing direction of a viewer at each moment when the omnidirectional video is played; a stream transmitting unit 605 configured to, at any moment of viewing, transmit a sub-video file in the viewing direction of the viewer at next moment according to a first stream transmission mode, and transmit sub-video files beyond the viewing direction of the viewer at next moment according to a second stream transmission mode, wherein a frame rate of the first stream transmission mode is higher than a frame rate of the second stream transmission mode.

Optionally, as shown in FIG. 6B, the device 600 further includes: a second obtaining unit 606 configured to obtain historical viewing information of the omnidirectional video. The predicting unit 604 is configured to predict the viewing direction of a viewer at each moment according to the historical viewing information.

Optionally, the omnidirectional video file is an omnidirectional video file obtained and stored by processing an omnidirectional video stream in an Equirectangular projection mode. Then, the first obtaining unit 601 is configured to: optimize the coding weight parameter through calculation in accordance with the following equation:

$$\operatorname{argmin} \sum_i \cos(\varphi_i) D_i \text{ s.t. } \sum_i R_i = R;$$

with $D_i$ representing a degree of distortion of the i-th pixel, $R_i$ being a number of bits used by the i-th pixel, $\varphi_i$ being a latitude of the i-th pixel, $\overline{\cos(\varphi)}$ being an average value of cosine values of latitudes of all pixels in the coding unit, and R being a total number of bits used by the coding unit, wherein $D_i$ and $R_i$ corresponding to the optimal solutions in the above equation are also solutions of the following equation:

$$J = \sum_i \cos(\varphi) D_i + \lambda R \approx \overline{\cos(\varphi)} \sum_i D_i + \lambda R;$$

with λ being a coding weight parameter assigned to the coding unit and an objective of rate constrained distortion optimization (RDO) being minimizing J.

Optionally, the determining unit 602 is configured to: calculate a quantization parameter QP of the coding unit according to the optimized coding weight parameter in accordance with the following equation:

QP=⌊4.2005 log(λ)+13.7122+0.5⌋, wherein QP determines the degree of distortion of the coding unit after being coded;
determine the coding mode corresponding to the coding unit according to the quantization parameter.

It needs to be noted that the division of the units of the optimized coding device 600 for an omnidirectional video is merely division of logic functions, and there may be other division ways in actual implementation. Moreover, there may also be a plurality of physical implementation ways for the above functional units.

For example, the hardware of the optimized coding device 600 for an omnidirectional video may include: a processor, a memory, an interface and a communication bus, wherein the processor, the memory and the interface communicate with one another by means of the communication bus; the memory is configured to store program codes, and the processor is configured to run the program codes to carry out the optimized coding method for an omnidirectional video provided by the above method embodiment.

In addition, it should be clearly known by a person skilled in the art that for the sake of convenience and simplicity of descriptions, the specific working processes of the units of the device as described above may refer to the corresponding processes in the preceding method embodiment, which are not redundantly described herein.

It should be understood that the device and method disclosed in the embodiments provided by the present application may be implemented in other ways. For example, various functional units in each embodiment of the present disclosure may be integrated in one processing unit; alternatively, various units may exist independently and physically; or, two or more than two units may be integrated in one unit. The above integrated unit may be implemented in the form of hardware, or in the form of hardware in combination with software functional units.

The above integrated unit implemented in the form of the software functional units may be stored in a computer readable storage medium. The above software functional units are stored in a storage medium, and include a plurality of instructions to cause a computer device (which may be a personal computer, a server, a network device or the like) to carry out part of the steps of the method in each embodiment of the present disclosure. The preceding storage medium includes various mediums capable of storing data, such as a USB flash disk, a mobile hard disk, an RAM (Random Access Memory), a magnetic disk or an optical disk.

The foregoing descriptions are merely the embodiments of the present disclosure, whereas the protection scope of the present disclosure are not limited to this. Any alternation or substitution that would be easy for any person skilled in the art to conceive of in the technical scope of the disclosure of the present disclosure should fall into the protection scope of the present disclosure. Hence, the protection scope of the present disclosure is in accordance with the protection scope of the claims.

The invention claimed is:

1. An optimized coding method for an omnidirectional video, characterized by comprising:
   obtaining attribute information of each coding unit of an omnidirectional video file;
   determining a coding mode corresponding to each coding unit according to the attribute information of each coding unit; and
   coding each coding unit according to the coding mode corresponding to each coding unit;
   the omnidirectional video file is a video file that is obtained and stored by processing an omnidirectional video stream in an Equirectangular projection mode, and the step of obtaining the attribute information of each coding unit of the omnidirectional video file comprises:
   optimizing a coding weight parameter according to an actual display area of each coding unit during playing, the attribute information including the optimized coding weight parameter;
   the step of optimizing the coding weight parameter according to the actual display area of each coding unit during playing comprises:
   optimizing the coding weight parameter through calculation in accordance with the following equation:

$$\operatorname{argmin} \sum_i \cos(\varphi_i) D_i \text{ s.t. } \sum_i R_i = R;$$

with $D_i$ representing a degree of distortion of the i-th pixel, $R_i$ being a number of bits occupied by the i-th pixel, $\varphi_i$ being a latitude of the i-th pixel, $\overline{\cos(\varphi)}$ being an average value of cosine values of latitudes of all pixels in the coding unit, and R being a total number of bits occupied by the coding unit, wherein $D_i$ and $R_i$ corresponding to the optimal solutions in the above equation are also solutions of the following equation:

$$J = \sum_i \cos(\varphi)D_i + \lambda R \approx \overline{\cos(\varphi)}\sum_i D_i + \lambda R;$$

with $\lambda$ being a coding weight parameter assigned to the coding unit and an objective of rate constrained distortion optimization (RDO) being minimizing J.

2. The method according to claim 1, characterized by further comprising:
predicting a viewing direction of a viewer at each moment when the omnidirectional video is played;
at any moment of viewing, transmitting a sub-video file in the viewing direction of the viewer at next moment according to a first stream transmission mode, and transmitting sub-video files beyond the viewing direction of the viewer at next moment according to a second stream transmission mode, wherein a frame rate of the first stream transmission mode is higher than a frame rate of the second stream transmission mode.

3. The method according to claim 2, characterized in that the step of predicting the viewing direction of a viewer at each moment when the omnidirectional video is played comprises:
obtaining historical viewing information of the omnidirectional video; and
predicting the viewing direction of a viewer at each moment according to the historical viewing information.

4. The method according to claim 1, characterized in that the step of determining the coding mode corresponding to the coding unit according to the attribute information of the coding unit comprises:
calculating a quantization parameter QP of the coding unit according to the optimized coding weight parameter in accordance with the following equation:

QP=⌊4.2005 log(λ)+13.7122+0.5⌋, wherein QP determines the degree of distortion of coding unit after being coded; and
determining the coding mode corresponding to the coding unit according to the quantization parameter.

5. A non-transitory computer readable storage medium with a computer program stored thereon, wherein the program realizes method comprising the following steps:

obtaining attribute information of each coding unit of an omnidirectional video file;
determining a coding mode corresponding to each coding unit according to the attribute information of each coding unit; and
coding each coding unit according to the coding mode corresponding to each coding unit;
the omnidirectional video file is a video file that is obtained and stored by processing an omnidirectional video stream in an Equirectangular projection mode, and the step of obtaining the attribute information of each coding unit of the omnidirectional video file comprises:
optimizing a coding weight parameter according to an actual display area of each coding unit during playing, the attribute information including the optimized coding weight parameter;
the step of optimizing the coding weight parameter according to the actual display area of each coding unit during playing comprises:
optimizing the coding weight parameter through calculation in accordance with the following equation:

$$\mathop{\mathrm{argmin}}\sum_i \cos(\varphi_i)D_i \text{ s.t. } \sum_i R_i = R;$$

with $D_i$ representing a degree of distortion of the i-th pixel, $R_i$ being a number of bits occupied by the i-th pixel, $\varphi_i$ being a latitude of the i-th pixel, $\overline{\cos(\varphi)}$ being an average value of cosine values of latitudes of all pixels in the coding unit, and R being a total number of bits occupied by the coding unit, wherein $D_i$ and $R_i$ corresponding to the optimal solutions in the above equation are also solutions of the following equation:

$$J = \sum_i \cos(\varphi)D_i + \lambda R \approx \overline{\cos(\varphi)}\sum_i D_i + \lambda R;$$

with $\lambda$ being a coding weight parameter assigned to the coding unit and an objective of rate constrained distortion optimization (RDO) being minimizing J.

6. An computer device, comprising:
the computer readable storage medium of claim 5; and
one or more processors, used for executing the program in the computer readable storage medium.

* * * * *